United States Patent [19]

Dukich et al.

[11] 3,919,475

[45] Nov. 11, 1975

[54] HEAD ATTACHED TELEVISION

[75] Inventors: Peter P. Dukich, Blaine; Robert L. Lechevalier, Minneapolis; John A. Volk, West St. Paul, all of Minn.

[73] Assignee: Honeywell Inc., Minneapolis, Minn.

[22] Filed: Oct. 9, 1974

[21] Appl. No.: 513,432

[52] U.S. Cl. .......... 178/7.91; 178/7.89; 178/DIG. 1

[51] Int. Cl.$^2$ .......... H04N 7/18

[58] Field of Search ......... 178/6.8, DIG. 1, DIG. 20, 178/DIG. 32, 7.8, 7.89, 7.91

[56] References Cited

UNITED STATES PATENTS

| | | | |
|---|---|---|---|
| 3,205,303 | 9/1965 | Bradley | 178/DIG. 20 |
| 3,670,097 | 6/1972 | Jones | 178/DIG. 20 |

*Primary Examiner*—Howard W. Britton
*Attorney, Agent, or Firm*—Charles G. Mersereau; Henry L. Hanson

[57] ABSTRACT

A self contained, remotely controlled color television system is disclosed. The system utilizes a small head-mounted television camera having an integral field-of-view illumination system which is adapted to transmit a picture of the operations carried out by the wearer of the camera to be remotely viewed and/or recorded by a third party. The focusing and aiming of the camera is remotely controlled from a console equipped with controls and a television monitor. The illumination system utilizes a dual beam such that both the transmitted picture and the work carried on by the wearer are illuminated virtually without shadows and without interference to the field of view of the wearer. A second stationary mounted camera may be added to the system to provide additional coverage. Video imagery produced by the system is of a high quality which makes it quite useful for teaching and demonstrating such things as delicate surgical procedures of the type often found in dental, abdominal, cardiovascular and neurosurgery.

8 Claims, 5 Drawing Figures

HEAD ATTACHED TELEVISION

BACKGROUND OF THE INVENTION

1. Field of the Invention

This invention relates generally to a method and apparatus of remotely observing manual manipulations and, more particularly, the remotely controlled television system for observing such manual operations as surgery.

2. Description of the Prior Art

In the prior art several techniques have been utilized to mount cameras in a fashion which allows them to follow the head movements of an individual in an attempt to coordinate the field of view of the camera with the filed of view of the individual involved. One such device is contained in a patent to N. H. Mackworth et al, U.S. Pat. No. 3,236,578 issued Feb. 22, 1966, which illustrates and describes an ophthalmic head mounted system for determining the point of visual concentration of a subject for the benefit of a third party observer. A split beam prism system is utilized to locate a spot of light reflected from the wearer's eye on the overall field of view to indicate the point of central concentration of the wearer. Like many other devices of this type, however, the Mackworth device depends upon the wearer to look straight ahead, does cause some visual obstruction to the wearer and does not provide for real-time remote control, aiming and focussing.

Many attempts have been made in the prior art to produce video and film photography of such intricate manual minipulations including surgical procedures and the like. The most commonly used method for viewing surgical operations involves use of one or more dolly-mounted cameras (including operators) or, overhead-mounted remotely aimed and controlled cameras. Although some excellent photographic results have been achieved by professionally organized teams of technicians utlizing such photographic equipment, these prior methods suffer from serious drawbacks. With the use of dolly-mounted equipment, the operating surgeon may often have to stop his procedure and draw back from the operating site to permit useful camera coverage. Also, the camera often requires repositioning before the proper view is obtained and must be moved out of the way again before the surgery can proceed. Motion of equipment other than medical personnel close to the patient in this manner threaten the integrity of the sterile field required in prolonged surgical procedure which involves some added risks for the patient.

While overhead remotely controlled cameras eliminate some of the foregoing difficulties, they may require special patient positioning to obtain unobstructed coverage. While two or three such remote cameras may provide good film coverage, they represent a significant capital investment for a single operating room or a significant amount of labor to shift the equipment from one operating room to another. The necessity of using unusually long focal length lenses on such remote cameras, however, may produce a pictorial compression of distances which may distort the image of depth perception in operating sites where depth is significant.

In any multiple camera arrangement, the costs of investment in capital equipment and labor to operate the equipment is quite large. Thus, these efforts have had to be reserved for especially important procedures. In addition to the expense of filming such procedures by multiple cameras, in order to produce an acceptable final film, a great deal of post-operative editing effort is normally required because of the extensive overlapping footage normally produced to insure that all important events and the procedure are recorded and that good coverage is obtained from at least one camera. Although preliminary editing can normally be done by skilled technical personnel, the final editing requires a surgeon or other highly qualified medical person who is completely familiar with the original surgical procedure. While the real-time video editing for live viewing is possible utilizing multiple television cameras, to be successful, this approach would also involve large equipment moving in the operating room and would again require a surgeon or other highly qualified medical staff person working directly with the television producer on a full time basis during the entire medical procedure.

SUMMARY OF THE INVENTION

By means of the present invention, the problems associated with obtaining an undistorted full, real-time view of surgical or other intricate manual operations without interferring with or requiring any assistance from the person conducting the operation are solved. A unique head-mounted camera system is provided complete with near parallax-free cold illumination, and remotely controlled focussing and aiming optics. The system may also have automatic focussing and/or aiming as additional features. The camera, optical focus, line of sight, plus all video controls including monitoring and recording (if desired) are operated by a single operator at a remote control console located outside the work area. The system may be caused to function as a self-contained enity or, for example, as part of a larger closed-circuit educational television complex.

The basic system of the invention includes the head mounted unit, an auxiliary operating room (OR) unit and a remote control console. The head-mounted unit is equipped with pick-up devices, which normally include a light weight miniaturized color television camera and associated video-audio transmission systems, a unique optical sub-system of lenses and mirrors mounted in a manner which does not obstruct the vision or field of view of the wearer, a cold illumination system (having separate sources such as flexible fiber optical bundles) mounted with associated optics which cause the illumination to converge on the work area and remote control activator subassemblies. The auxiliary (OR) unit provides primary and alternate light sources for the cold illumination system plus certain electronic circuiting for the head-mounted unit. A control sub-system contained in a remote console but connected electrically to the head-mounted unit via the auxiliary (OR) unit is provided which contains video and, if desired, audio monitors, controls to command remote focus and aiming functions of the optical sub-system, any video or audio switching desired and/or a video tape recorder. A single operator may aim and focus the camera in response to real-time observations on the video monitor and control the video tape recorder.

BRIEF DESCRIPTION OF THE DRAWINGS

In the drawings wherein like numerals are utilized to denote like parts throughout the same.

DESCRIPTION OF THE PREFERRED EMBODIMENT

Figure 1:
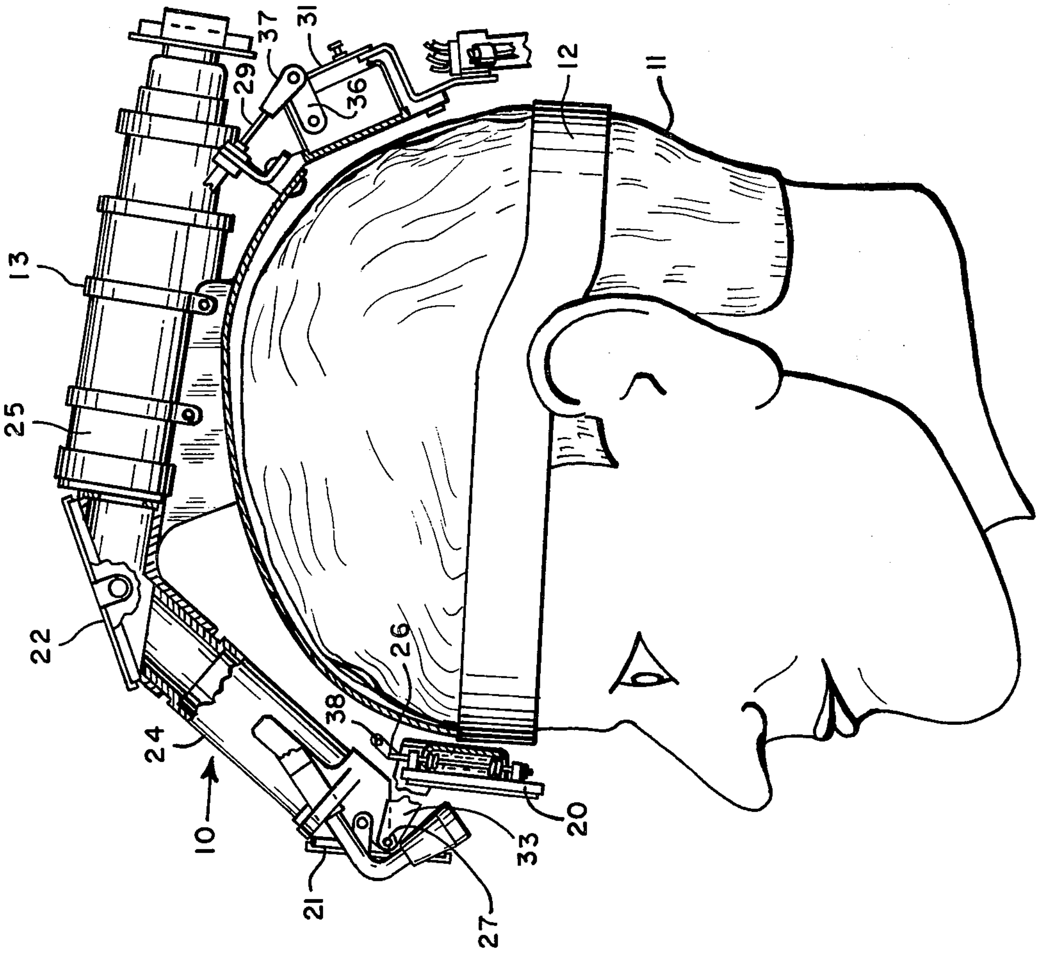
FIG. 1 is a profile view of the head-mounted unit with the unit enclosure cut away to show the internal workings.

Turning now to the drawings and, in particular, to FIG. 1 thereof, we see a representation in profile of the head-mounted unit of the invention in place on the head of the wearer with the unit enclosure removed exposing the inner workings of the head-mounted unit. The head-mounted unit 10 is typically attached to a head 11 as by headband 12 although it may also be designed to be integral with a helmet-type of headgear. The remaining sub-systems located in the head-mounted unit of the preferred embodiment, discussed in greater detail below, include an optical sub-system which comprises lenses and mirrors plus their associated mounting structures (including adjustments and focus), a television camera sub-system which includes video and audio system and an illumination sub-system. The head-attached unit consists of these systems integrally mounted in a light weight compact coordinated package.

Figure 4:
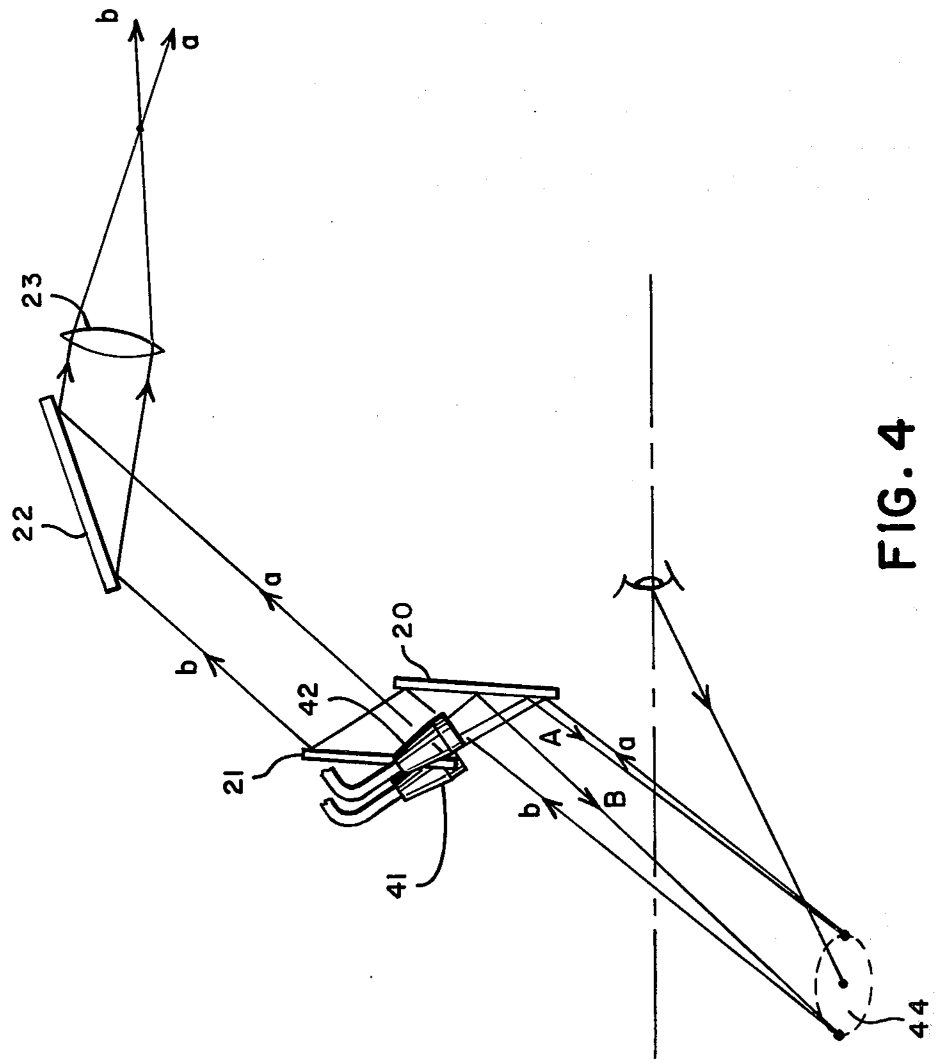
FIG. 4 is a simplified schematic optical diagram of the illumination and imaging optics of the head-attached unit; and, FIG. 5 is a perspective view of a remote control console in accordance with the present invention.

The basic optical system is shown in FIG. 1 and in the optical schematic diagram of FIG. 4. The system consists basically of mirrors 20, 21, and 22 and camera lens 23 (FIG. 4). Tubular sections 24 and 25 form an enclosed optical path from the mirror 21 to the camera section at 13. Mirrors 21 and 22, in the preferred embodiment, are mounted in a stationary position such that an image reflected from the mirror 20 onto the mirror 21 follows a bore-sighted path from that point into the television camera.

Figure 3:
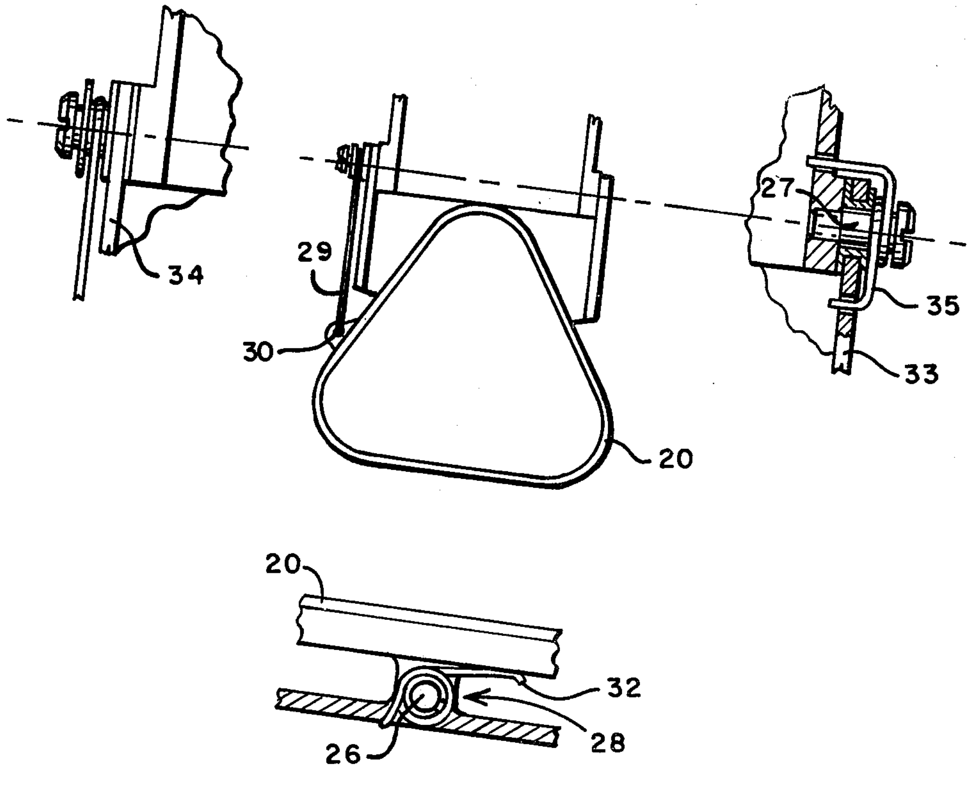
FIG. 3 is a detached enlarged view of the aiming mirror depicted to show the operation thereof.

Thus, in the preferred embodiment, the mirror 20 is mounted so that it may be pivoted about a vertical pivot, shown generally at 26 to control the horizontal deflection or yaw of the field of view and about a horizontally disposed pivot mounting, shown generally at 27, to control the pitch or vertical attitude of the field of view. FIG. 3 depicts an enlarged view of the mirror 20 of FIG. 1 along with enlarged details of a method of pivotly mounting the mirror 20. Thus, the yaw control of the vertically mounted pivot 26 consists of conventional top and bottom pivots joints one of which is shown at 28. A control wire 29 attached at one end to an ear 30 on the mirror 20 and at the other to an electromechanical servo system, like that shown at 31 (FIG. 1) which may be, for example, a KPS-12 servo available from Kraft Systems Inc., Vista Ca., is utilized to position the yaw angle of the mirror 20. Return springs on the pivot joints, one of which is shown at 32, work against and create tension in the control wire 29 cause yaw adjustment to return in the opposite direction as tension on wire 29 is decreased by the servo system such as that illustrated at 31. In a like manner, adjustment of the pitch or vertical position of the mirror is accomplished by tension on a control wire attached to the mirror vertical pivot as at 38 (FIG. 1). The mirror pivot in turn is attached to a mounting bracket 33 (FIG. 1) which has two mounting arms 33 and 34 (FIG. 3) which may be conventionally mounted and form the horizontal pivot joints of the horizontally disposed pivot 27 which allows variation in the pitch or vertical alignment of the mirror 20. Again, a return spring as depicted at 35 is utilized to return mirror 20 towards its fullest forward (up looking) position as the tension on the corresponding control wire is decreased.

The two servo motors involved in the positioning of the mirror 20 may be identical with that illustrated at 31 (FIG. 1). Thus, by remote electrical control a servo motor is used to operate a bellcrank or eccentric 36 which cooperates with pivotal sleeve 37 to position the mirror utilizing the control wires as at 29. A similar electromechanical servo system, not shown, is used to remotely position the TV camera lens, shown in the optical diagram of FIG. 4, at 23, by axially adjusting its position relative to the TV camera itself in a well-known photographic focusing manner.

Figure 2:
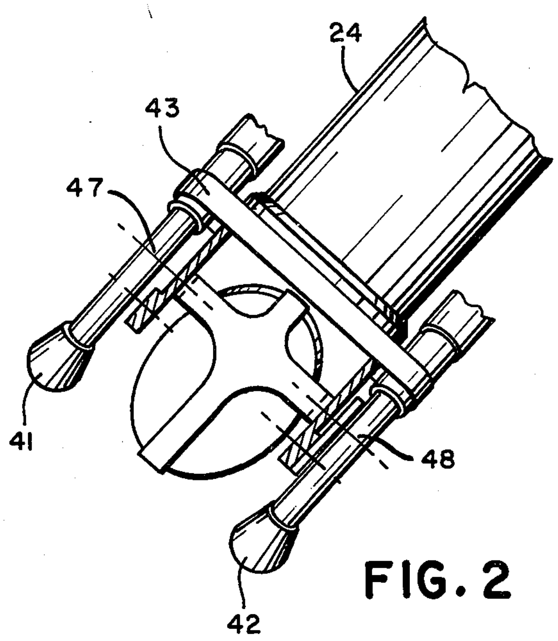
FIG. 2 is a partial enlarged top view of the illumination and mirror system of the head-mounted unit of FIG. 1.

The illumination system 40 which can best be seen in the enlarged fragmentary view of FIG. 2, comprises two separate illuminators 41 and 42 rigidly attached to the tubular member 24 as by a member 43. The mounting of the illuminators is such that both are bore-sighted to the camera line of sight so that, as discussed below, the illumination system may be used both to illuminate the subject matter and the field of view and to properly aim the camera in the field of view. In addition, illuminators 41 and 42, as can readily be seen in the optical diagram of FIG. 4, are mounted such that after the light eminating therefrom is reflected off the face of mirror 20 the effect is that of a slightly diverging combined source of light as it strikes the field of view 44. This technique virtually eliminates shadows in the field of view and allows crisp shadowless images to be seen over a greater depth of field in the field of view. The light energy transmitted by the illumination optics subassemblies 41 and 42 may be provided by a source such as a conventional low-voltage quartz halogen lamp shown in block form at 45 in FIG. 5. The light energy from the lamp is then transmitted to the head-mounted unit as by means of flexible fiber optic bundle(s), indicated at 46, (FIG. 5) which separate to feed separate illumination subassemblies as at 47 and 48 (FIG. 2 ).

While no specific degree of illumination is required, the illumination at the field of view 44 should be sufficient to (1) provide sufficient illumination for operation of a color television camera; (2) provide sufficient spot illumination so that aiming of the television camera may be accomplished utilizing the spot; and (3) aid the view of the wearer by providing virtually shadowless illumination for his immediate work area. It has been determined that such a scene illumination level should be a minimum of 200 foot lamberts and a value of about 400 foot lamberts or more as scene brightness is preferred. The optical configuration of the illumination subassemblies 41 and 42 should be such that a spot size from about two inches in diameter to about 6 inches in diameter be provided at the approximate working distance of 18 inches. The mounting of the illumination subassemblies may also be made mechanically adjustable so that the angle of the field of view may be adjusted as desired when a considerable larger or smaller spot size is required. It must be remembered, however, that the minimum scene brightness must be maintained in any event. One successful model utilized 6 nominal field of view (at an 18-inch working distance) which yielded approximately a 3-inch diameter spot. Also, a selectable 3 or 9 field of view has been achieved by utilizing conventional replacement optical elements.

The illumination brightness may be made adjustable in a conventional manner by providing an adjustment knob at source 45. One successful illuminating system utilizes a 150 watt quartz halogen lamp, available from The General Electric Company, of Schenectady, N.Y., and two fiber optic bundles manufactured by The American Optical Company, of Sturbridge, Mass.

The color television camera sub-system normally includes video and audio iputs. One-inch, single tube vidicon models available from Magnovax Corportion (Model CV-400), Cohu Corporation (Model 12120) and others may be used. These are normally modified in form as described below. The above type camera provides components for a lightweight, small head-mounted unit consisting of the single vidicon and yoke, video pre-amplifiers and an audio transducer (capacitor microphone) to provide the initial television and audio input in a well-known manner. A miniature speaker(s) is added to provide two-way audio communication. Because sweep amplifiers and some other vidicon control circuits must be located close to the camera tube in order for the system to function properly. A conventional support unit is shown in block form at 49 (FIG. 5 ) and connected to the head-mounted camera as by flexible conduit 50 illustrates these conventional parts. The bulk of the color television camera electronics are located in the control console, (discussed below).

Figure 5:
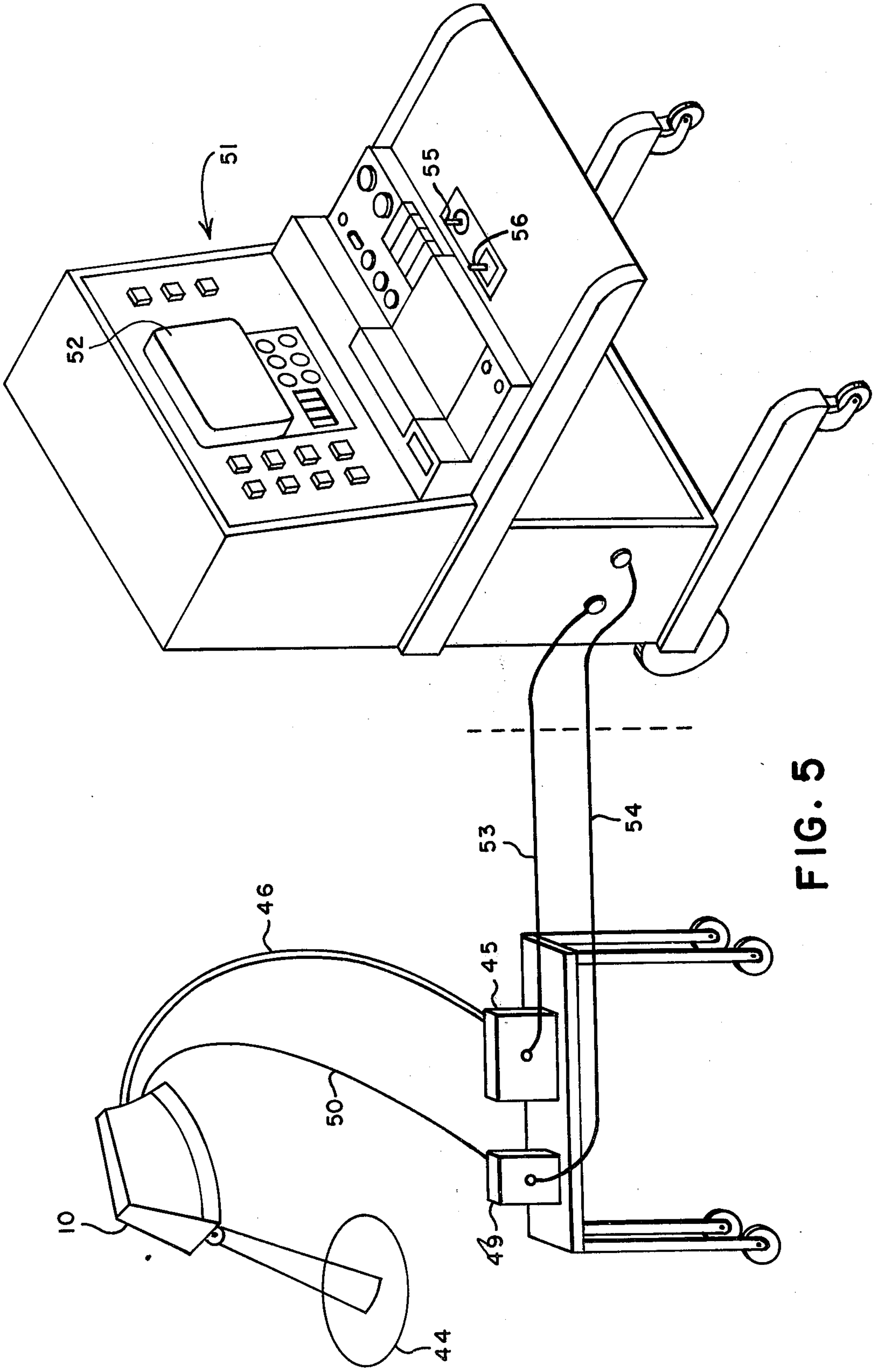

The control console 51 is illustrated in FIG. 5. That unit contains all the controls for operating the remote focussing and aiming and also the controls for a remote video monitor 52 with its associated controls and a conventional audio monitor (not shown). Such other things as tape recorder controls, etc. which are conventional additions to any such system may also be used in conjunction with the monitor 52. The monitor 52 is connected remotely as through cables 53 and 54 with the illumination source 45 and camera-associated electronics 49, respectively. Both the console 51 and the support units 45 and 49 are shown as dolly-mounted for convenience in moving same. In the preferred mechanization units 45 and 49 are physically united to form a single unit which may be mounted on a standard hospital "IV" stand for convenience and minimum space utilization in a surgical operating room.

A single operator sitting at the console 51 then may manipulate the control as a joy stick 55 while viewing a real-time image of the field of view on the monitor 52 to aim the field of view and the camera to coincide with the manual operations of the wearer of the head-attached unit. By aligning the spot of the field of view up with the manual manipulations of the wearer of the head-mounted unit, the operator at the console is also automatically lining the camera with this field of view as the spot of the field of view is bore-sighted with the camera system. A separate control 56 may be utilized to remotely adjust the focus of the camera 25 also in response to the focus of the real-time image as seen by the operator on the monitor 52.

It can readily be seen that the present invention contemplates a vastly improved method and apparatus for viewing intricate manual manipulations such as those performed by a surgeon utilizing a system which, unlike previous systems, as can readily be seen by FIG. 1, does not interefere in any way with the visual line of sight of the wearer of the head-mounted unit. In addition, it provides a simple, extremely accurate method and apparatus for remotely focussing and aiming a camera unit in precisely aligning field of view with the manual work field of the wearer of the head-unit. Also, the unique illumination system provided by the present invention has been found to be a distinct aid in illuminating the work area for the wearer of the head-mounted unit.

In addition to the system described above, one or more stationary camera systems may be added to the system, in a conventional manner of the past systems if a larger field of view is required for certain views of the manual operation of the wearer or if such additional camera work is required for other reason. In such cases, additional monitors may be added to the console 51 corresponding to the additional cameras.

Also, while the preferred embodiment utilizes a remote console unit, in certain applications where a less-complex setup is required, a smaller portable unit may be employed.

We claim:

1. A remotely controlled head-mounted visual apparatus for viewing manual operations carried on by the wearer, said apparatus comprising camera means for generating signals representative of a visual image received, aiming means for determining the field of view of said camera means, focussing means for said camera means, illumination means for illuminating the field of view of said camera means, control means for controlling said focussing and aiming means for said camera means, means for reconverting said signals to reproduce said visual image, means for transmitting said signals from said camera means to said means for reconverting, real-time viewing means for viewing said reconverted image, and means for mounting said camera means, focussing means and illuminating means on the head of the wearer.

2. The apparatus of claim 1, wherein said camera means comprises a vidicon tube and its associated electronics and said viewing means comprises a remote television monitor.

3. The apparatus of claim 1 further comprising means for recording said reconverted image.

4. The apparatus of claim 1 wherein said means for remotely controlling said focus comprises an electromechanical servo system mechanically linked to the lens of said camera in a manner in which said lens may be positioned in response to commands from a remote real-time observer.

5. The apparatus of claim 1 wherein said aiming means comprises a first mirror disposed to receive and reflect a visual image from a field of view substantially along the line of sight of said wearer, said mirror being pivotally mounted such that said field of view of said mirror may be adjusted as required to follow the manual operations of said wearer, and means for bore-sighting said reflected visual image to the input of said camera means.

6. The apparatus of claim 5 wherein said means for boresighting said reflected visual image comprises an enclosed optical path having second and third mirrors, said second and third mirrors disposed to sequentially receive and reflect said image from said first mirror along said enclosed optical path.

7. The apparatus of claim 5 wherein said control means for remotely controlling said aiming means, comprises an electromechanical servo system mechanically linked to said first mirror, said servo system adapted to pivot said first mirror to control said field of view in response to commands from a remote real-time observer.

8. The apparatus of claim 5 wherein said illumination system comprises separate illuminators disposed such that light eminating therefrom is reflected by said first mirror so as to produce a slightly diverging combined source coincident with said field of view.

* * * * *

UNITED STATES PATENT OFFICE
CERTIFICATE OF CORRECTION

PATENT NO. : 3,919,475

DATED : November 11, 1975

INVENTOR(S) : Peter P. Kukich, Robert L. LeChevalier, John A. Volk

It is certified that error appears in the above-identified patent and that said Letters Patent are hereby corrected as shown below:

On the title page, please correct the spelling of the last name of the second inventor, LeChevalier, which is spelled with a capital C rather than a lower case c.

In Column 1, line 40, delete "utlizing" and insert --utilizing--; in Column 1, line 49, after "manner" insert --may--.

In Column 2, line 13, delete "the".

At Column 3, line 60, after "Vista" insert --,--.

At Column 5, line 1, after "6" insert --degrees--; in Column 5, line 3, after "3" and after "9" insert --degrees--; at Column 5, line 14, delete "iputs" and insert --inputs--; in Column 5, line 25, delete "Because" and change "sweep" to --Sweep--.

In Column 6, line 2, delete "interefere" and insert --interfere--.

Signed and Sealed this

*fourth* Day of *May 1976*

[SEAL]

*Attest:*

RUTH C. MASON
*Attesting Officer*

C. MARSHALL DANN
*Commissioner of Patents and Trademarks*